United States Patent
Yamasaki

(10) Patent No.: US 9,991,516 B2
(45) Date of Patent: Jun. 5, 2018

(54) BATTERY PRODUCTION METHOD

(71) Applicants: Sadayoshi Yamasaki, Saga (JP);
Kazuaki Nasu, Miyazaki (JP)

(72) Inventor: Sadayoshi Yamasaki, Saga (JP)

(73) Assignees: Sadayoshi Yamasaki, Saga (JP);
Kazuaki Nasu, Miyazaki (JP)

(*) Notice: Subject to any disclaimer, the term of this patent is extended or adjusted under 35 U.S.C. 154(b) by 77 days.

(21) Appl. No.: 15/184,204

(22) Filed: Jun. 16, 2016

(65) Prior Publication Data

US 2016/0359167 A1 Dec. 8, 2016

Related U.S. Application Data

(63) Continuation of application No. PCT/JP2014/083663, filed on Dec. 19, 2014.

(30) Foreign Application Priority Data

Dec. 20, 2013 (JP) .................................. 2013-263200

(51) Int. Cl.
*H01B 1/24* (2006.01)
*H01B 1/04* (2006.01)
(Continued)

(52) U.S. Cl.
CPC ........... *H01M 4/5815* (2013.01); *B29B 17/02* (2013.01); *C10B 53/07* (2013.01); *H01B 1/04* (2013.01);
(Continued)

(58) Field of Classification Search
CPC ............. B29B 17/02; B29B 2017/0268; B29L 2030/00; B29L 2031/3468; C10B 53/07;
(Continued)

(56) References Cited

U.S. PATENT DOCUMENTS

2008/0032192 A1 2/2008 Yokomizo et al.
2011/0288351 A1 11/2011 Tamotsu Tana et al.
2015/0021525 A1* 1/2015 Naskar .................. C09C 1/482
252/502

FOREIGN PATENT DOCUMENTS

JP 06-338324 A 12/1994
JP 2005-008677 A 1/2005
(Continued)

OTHER PUBLICATIONS

International Search Report for PCT/JP2014/083663, dated Feb. 10, 2015.
(Continued)

*Primary Examiner* — Mark Kopec
*Assistant Examiner* — Jaison P Thomas
(74) *Attorney, Agent, or Firm* — Kubotera & Associates, LLC

(57) ABSTRACT

A battery production method is provided for producing the battery using the rubber material such as a tire containing sulfur as the raw material. In the method, the raw material is thermally decomposed, so that the raw material is separated into the solid portion and the dry distilled gas. In the next step, the dry distilled gas is cooled, so that the dry distilled gas is separated into the oil portion and the gaseous portion. In the next step, the oil portion is distilled, so that the oil portion is separated into the heavy oil, the light oil, and sulfur. In the next step, the heavy oil and sulfur are kneaded and thermally processed to produce the positive active substance or the positive electrode active material of the battery.

2 Claims, 4 Drawing Sheets

HH: Negative electrode active material
II: Positive electrode conductive material

(51) Int. Cl.
    *H01M 4/58*     (2010.01)
    *H01M 4/136*     (2010.01)
    *H01M 4/1397*     (2010.01)
    *H01M 4/62*     (2006.01)
    *B29B 17/02*     (2006.01)
    *C10B 53/07*     (2006.01)
    *B29L 30/00*     (2006.01)
    *B29L 31/34*     (2006.01)

(52) U.S. Cl.
    CPC .............. *H01B 1/24* (2013.01); *H01M 4/136* (2013.01); *H01M 4/1397* (2013.01); *H01M 4/624* (2013.01); *H01M 4/625* (2013.01); *B29B 2017/0268* (2013.01); *B29L 2030/00* (2013.01); *B29L 2031/3468* (2013.01)

(58) Field of Classification Search
    CPC .. H01M 4/136; H01M 4/1397; H01M 4/5815; H01M 4/624; H01M 4/625; H01B 1/24; H01B 1/04
    See application file for complete search history.

(56) References Cited

FOREIGN PATENT DOCUMENTS

| | | |
|---|---|---|
| JP | 2005-298602 A | 10/2005 |
| JP | 2011-003529 A | 1/2011 |
| JP | 2012-136672 A | 7/2012 |
| JP | 2012136672 A * | 7/2012 |
| WO | WO-2013087651 A1 * | 6/2013 ............... C09C 1/48 |

OTHER PUBLICATIONS

Extended European Search Report issued by European Patent Office (EPO) dated Aug. 7, 2017.

* cited by examiner

HH: Negative electrode active material
II: Positive electrode conductive material

BATTERY PRODUCTION METHOD

CROSS-REFERENCE TO RELATED APPLICATIONS

This is a continuation application of a prior PCT application No. JP2014/083663, filed on Dec. 19, 2014, which claims priority of a Japanese patent application No. 2013-263200, filed on Dec. 20, 2013.

BACKGROUND OF THE INVENTION AND RELATED ART STATEMENT

The present invention relates to a battery production method for producing a battery (a positive active substance, a positive conductive material, a positive current collector, and a negative active substance used in a battery) using a rubber material such as a tire containing sulfur and the like as a raw material.

Conventionally, a large quantity of rubber material and the like containing sulfur such as a tire has been produced. After the rubber material has been circulated as a product, the rubber material has been collected as a waste. Further, during a production process of the product, an excess of the rubber material has been collected.

After the rubber material is collected, the rubber material is processed at a recycling planet, so that the rubber material is recycled. In the recycling plant, the rubber material is thermally decomposed using a thermal decomposition chamber (for example, refer to Patent Publication 1).
Patent Publication 1: JP 2005-8677

In the past, the rubber material are not efficiently recycled as resources except a limited application, in which a recycled material is used as a heat source after the rubber material is thermally decomposed in the thermal decomposition chamber.

In the recent years, a variety of electric devices has been widely available, and an electric vehicle has been developed. Consequently, a battery such as a lithium secondary-battery has been focused. Especially, it has been desired to increase a capacity of the battery.

Accordingly, an object of the present invention is to provide a method of efficiently recycling the rubber material such as the tire and the like that contains sulfur and is discarded by a large quantity into a battery.

SUMMARY OF THE INVENTION

According to a first aspect of the present invention, a battery production method is provided for producing a battery using a rubber material such as a tire containing sulfur as a raw material. In the method, the raw material is thermally decomposed, so that the raw material is separated into a solid portion and a dry distilled gas. In the next step, the dry distilled gas is cooled, so that the dry distilled gas is separated into an oil portion and a gaseous portion. In the next step, the oil portion is distilled, so that the oil portion is separated into a heavy oil, a light oil, and sulfur. In the next step, the heavy oil and the sulfur are kneaded and thermally processed to produce a positive active substance or a positive electrode active material of the battery.

According to a second aspect of the present invention, a battery production method is provided for producing a battery using a rubber material such as a tire containing sulfur as a raw material. In the method, the rubber material such as the tire containing the sulfur as the raw material is thermally decomposed, so that the raw material is separated into a solid portion and a dry distilled gas. In the next step, the dry distilled gas is cooled, so that the dry distilled gas is separated into an oil portion and a gaseous portion. In the next step, the oil portion is distilled, so that the oil portion is separated into a heavy oil, a light oil, and sulfur. In the next step, the heavy oil and the sulfur are kneaded and thermally processed to produce a positive conductive material or a positive electrode conductive material of the battery. In the next step, the solid portion is separated into a metal and a carbonized portion. In the next step, the carbonized portion is thermally processed to produce a positive conductive material or a positive electrode conductive material of the battery. In the next step, the positive active substance and the positive conductive material are used to produce a positive current collector or a positive electrode current collector of the battery.

According to a third aspect of the present invention, a battery production method is provided for producing a battery using a rubber material such as a tire containing sulfur as a raw material. In the method, the raw material is thermally decomposed, so that the raw material is separated into a solid portion and a dry distilled gas. In the next step, the solid portion is separated into a metal and a carbonized portion. In the next step, the carbonized portion is thermally processed to produce a positive conductive material or a positive electrode conductive material of the battery.

According to a fourth aspect of the present invention, a battery production method is provided for producing a battery using a rubber material such as a tire containing sulfur as a raw material. In the method, the raw material is thermally decomposed, so that the raw material is separated into a solid portion and a dry distilled gas. In the next step, the solid portion is separated into a metal and a carbonized portion. In the next step, the carbonized portion is thermally processed to produce a negative active substance or a negative electrode active material of the battery.

EFFECT OF THE INVENTION

According to the present invention, it is possible to efficiently recycle the rubber material such as the tire and the like that contains sulfur and is discarded by a large quantity into the battery.

PREFERRED EMBODIMENTS OF THE INVENTION

Hereunder, with reference to the accompanying drawings, specific embodiments of the present invention will be described with regard to a method of producing a battery (a positive active substance, a positive conductive material, a positive current collector, and a negative active substance used in a battery).

Figure 1:
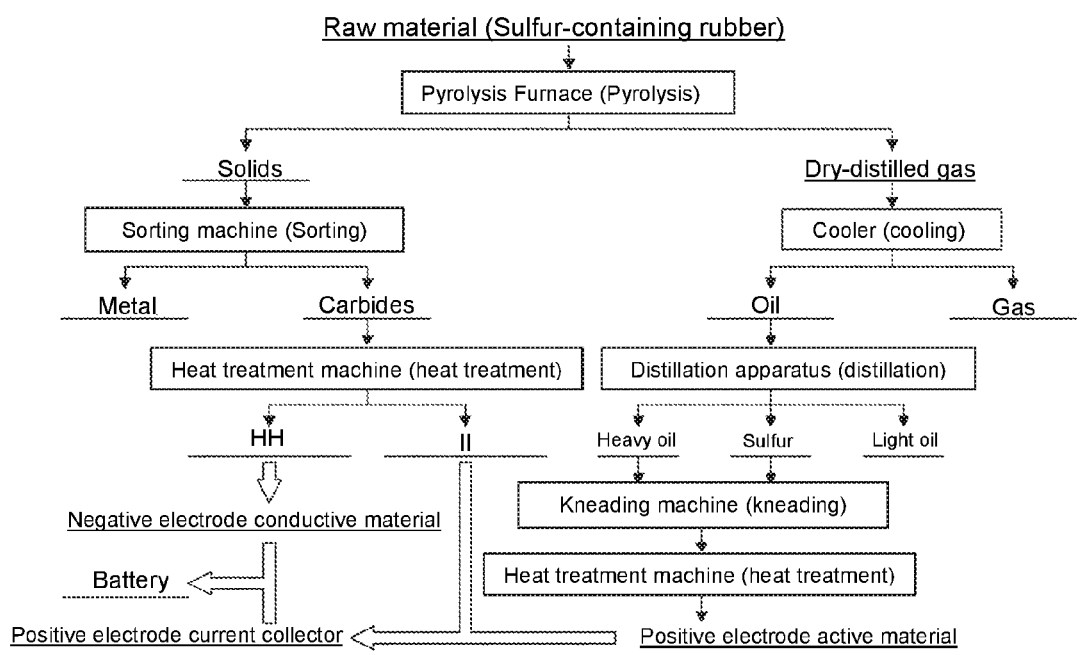
FIG. 1 is a flow chart showing a process of processing a rubber material.

According to the present invention, as shown in FIG. 1, using a rubber material as a raw material, the positive active substance, the positive conductive material, and the negative active substance are produced. Further, the positive active substance and the positive conductive material are used to produce the positive current collector. Further, the negative active substance is used to produce a negative current collector. Further, the positive current collector and the negative current collector are used to produce the battery. Accordingly, it is possible to efficiently recycle the rubber material.

According to the present invention, the rubber material may include various rubber products and a waste material. The rubber products contain sulfur and silicon, and may include a tire, that is discarded after use. The waste material also contains sulfur and silicon, and may include a defect product or an excess material produced and discarded during the production process of the tire.

In the first step, the rubber material as the raw material is thermally decomposed using a thermal decomposition chamber. Accordingly, the rubber material is separated into a solid portion in a solid state and a dry distilled gas in a gas state.

In the next step, after the solid portion is separated from the rubber material through the thermal decomposition, the solid portion is separated using a separation apparatus, so that the solid portion is separated into a metal and a carbonized portion.

It should be noted that the metal separated from the solid portion can be recycled as metal resources.

In the next step, the carbonized portion separated from the solid portion is crushed using a crushing apparatus. Afterward, the carbonized portion is thermally processed using a thermal processing apparatus at a temperature between 2,400° C. and 2,800° C. to remove zinc contained therein. Accordingly, it is possible to produce a high conductive material in a hollow shape. The high conductive material can be recycled as a positive conductive material of the battery as is. Further, after the high conductive material is washed to remove iron contained therein, the high conductive material can be recycled as the positive electrode conductive material of the battery. Further, after the carbonized portion is crushed, the carbonized portion may be carbonized and activated. Alternatively, after the carbonized portion is crushed and thermally processed, the carbonized portion may be carbonized and activated. Accordingly, the carbonized portion can be used as an active material for a capacitor or a supporting material for a fuel cell catalyst. Further, after the carbonized portion is crushed, the carbonized portion can be recycled as the negative active substance. The negative active substance may be molded using a binder, so that the negative active substance can be recycled as a negative current collector of the battery.

In the next step, after the dry distilled gas is separated from the rubber material through the thermal decomposition, the dry distilled gas is cooled using a cooling apparatus. Accordingly, the dry distilled gas is separated into an oil portion in a liquid state and a gaseous portion in a gaseous state (a non-condensed gas).

It should be noted that, in this step, it is possible to control compositions or generation ratios of the heavy oil and the non-condensed gas through adjusting a cooling temperature of the cooling apparatus. When the cooling temperature is lowered, the generation ratio of the heavy oil is increased, and an amount of hydrocarbons contained in the non-condensed gas decreased. Accordingly, when a detection apparatus is provided for detecting a density of the hydrocarbons contained in the non-condensed gas, it is also possible to control the cooling temperature so that the density of the hydrocarbons.

In the next step, after the non-condensed gas is separated from the dry distilled gas, the non-condensed gas is processed to remove sulfur using a desulfurizing apparatus after a safety apparatus reduces a pressure. Accordingly, it is possible to collect a hydrocarbon gas that does not contain sulfur components from the non-condensed gas. It should be noted that the hydrocarbon gas may be collected per components of gases using a fractional distilling apparatus. The hydrocarbon gas collected through the processes described above does not contain sulfur components and contains a large amount of carbon components. Accordingly, the hydrocarbon gas is suitable for using as a raw material of a carbon nano-tube, a carbon nano-fiber, and the like. Further, it is possible to efficiently utilize sulfur collected with the desulfurizing apparatus for producing the positive active substance (described later).

In the next step, after the oil portion is separated from the dry distilled gas, the oil portion is distilled using a distilling apparatus at a temperature lower than a boiling point of sulfur. Accordingly, the oil portion is separated into a light oil containing a large amount of sulfur, and a heavy oil that contains little amount of sulfur remains. The light oil containing a large amount of sulfur is processed to remove sulfur, so that the light oil is separated and collected into the light oil and sulfur. After the light oil is separated, it is possible to recycle the light oil as fuel.

In the next step, after the oil portion is separated into the heavy oil and sulfur, the heavy oil and sulfur are kneaded using a kneading apparatus, and are thermally processed using a thermal processing apparatus (a convection thermal processing and an autoclave processing). Accordingly, it is possible to produce the positive active substance in a solid state. It should be noted that sulfur used for producing the positive active substance is not limited to the one produced from the rubber material after the heavy oil is extracted. Alternatively, it is possible to use sulfur produced from other raw materials, being commercially available, or a mixture thereof.

As explained above, according to the present invention, the battery production method is provided for producing the battery using the rubber material such as a tire containing sulfur as the raw material. In the method, the raw material is thermally decomposed, so that the raw material is separated into the solid portion and the dry distilled gas. In the next step, the dry distilled gas is cooled, so that the dry distilled gas is separated into the oil portion and the gaseous portion. In the next step, the oil portion is distilled, so that the oil portion is separated into the heavy oil, the light oil, and sulfur. In the next step, the heavy oil and sulfur are kneaded and thermally processed to produce the positive active substance or the positive electrode active material.

In the next step, after the positive active substance is produced through the processes described above, the positive active substance is crushed. Then, the positive active substance is mixed with a conductive material and a binder into a solvent. Then, the mixture is molded to produce the battery (the positive current collector). It should be noted that the conductive material, the binder, and the solvent are similar to those used in a lithium ion secondary battery, in which conventional cobalt is used as an active substance. Further, it should be noted that the conductive material, the binder, and the solvent are mixed at a ratio similar to that of the lithium ion secondary battery.

Figure 2:
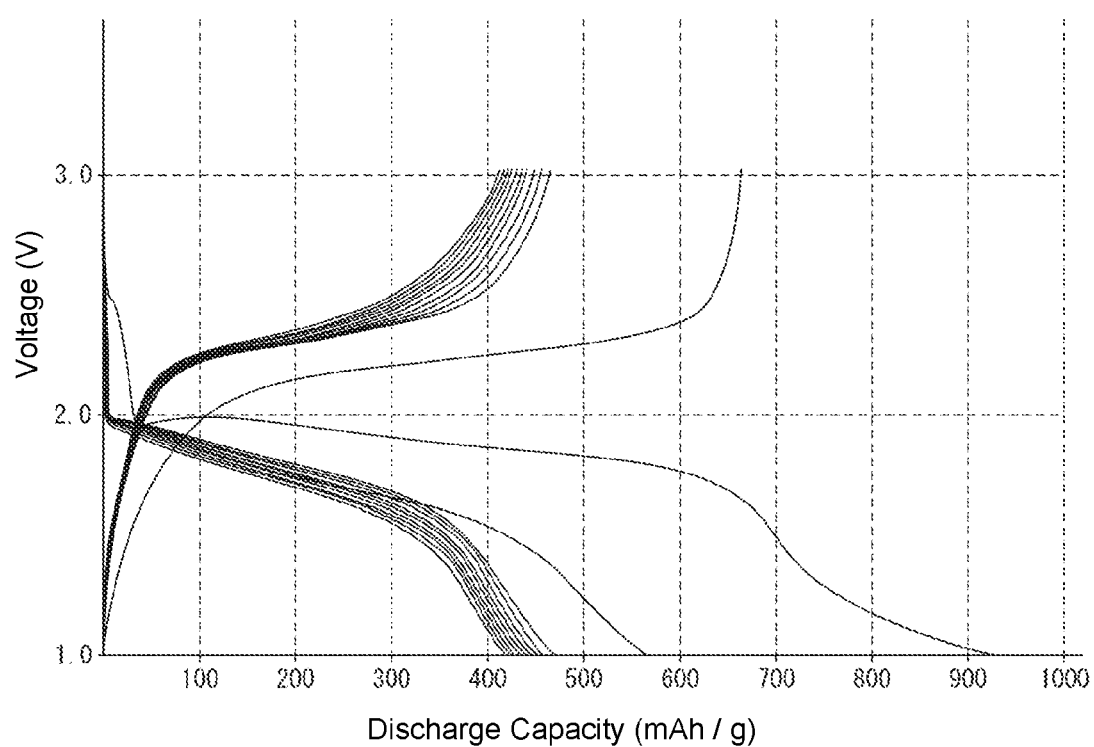
FIG. 2 is a graph showing a charging and discharging characteristic of a battery.

As a result, the lithium ion secondary battery, in which conventional cobalt is used as the active substance, shows a capacity per weight of about 200 mAh/g. On the other hand, the battery produced through the method of the present invention shows the capacity per weight over 400 mAh/g as shown in FIG. 2. It should be noted that FIG. 2 is a graph showing a charging and discharging characteristic of the battery produced through the method of the present invention. More specifically, the battery is repeatedly charged and discharged with an electrical current of 50 mA per 1 g of the positive active substance at a discharge termination voltage of 1.0 V and a charge termination voltage of 3.0 V. The battery shows the capacity per weight of 900 mAh/g at the initial discharge, and shows the capacity per weight over 400 mAh/g after the battery is repeatedly charged and discharged eleven times.

As described above, according to the present invention, it is possible to produce the positive active substance capable of increasing the capacity of the battery.

Further, according to the present invention, a battery production method is provided for producing a battery using a rubber material such as a tire containing sulfur as a raw material. In the method, the raw material is thermally decomposed, so that the raw material is separated into a solid portion and a dry distilled gas. In the next step, the solid portion is separated into a metal and a carbonized portion. In the next step, the carbonized portion is thermally processed to produce the positive conductive material or the positive electrode conductive material.

In the next step, after the positive conductive material is produced through the processes described above, the positive conductive material is mixed with the positive active substance and a binder into a solvent. Then, the mixture is molded to produce the battery (the positive current collector). It should be noted that the binder and the solvent are similar to those used in the lithium ion secondary battery, in which conventional cobalt is used as an active substance. Further, it should be noted that the binder and the solvent are mixed at a ratio similar to that of the lithium ion secondary battery. Further, it should be noted that the positive active substance is the same as described above and mixed with the same ratio as described above.

Figure 3:
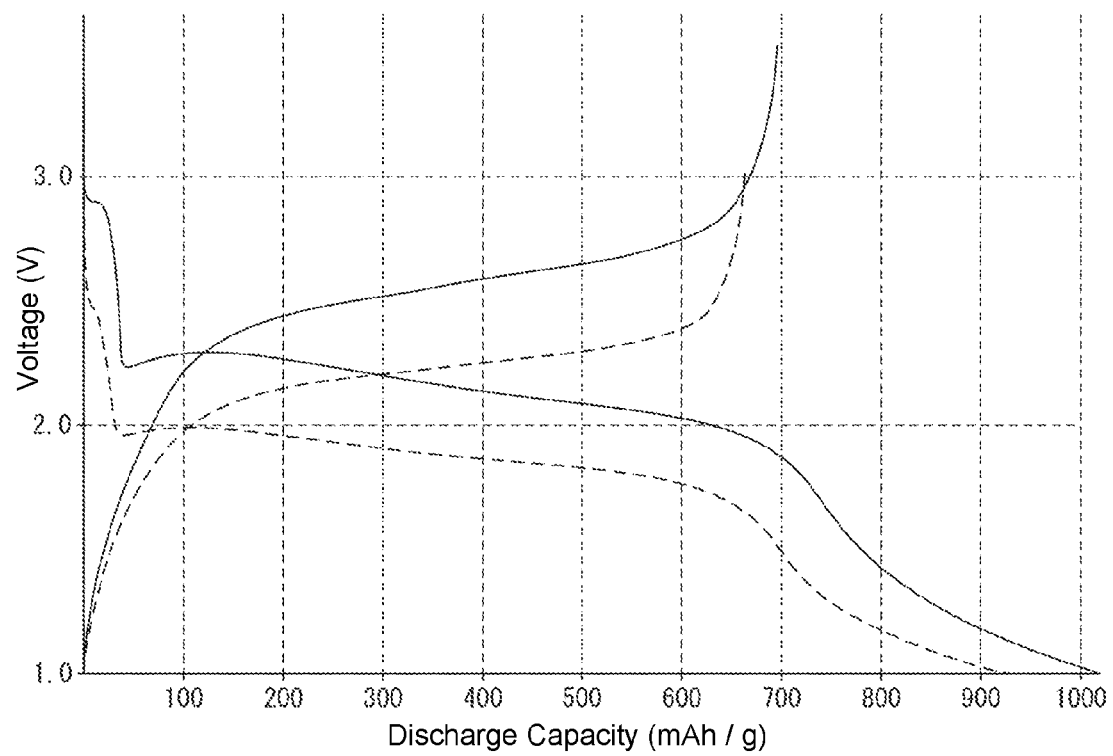
FIG. 3 is a graph showing a charging and discharging characteristic of a battery.

As a result, the lithium ion secondary battery, in which the positive active substance of the present invention and the conventional conductive material are used, shows the capacity per weight of 900 mAh/g at the initial discharge. On the other hand, the battery, in which the positive conductive material of the present invention is used instead of the conventional conductive material, shows the capacity per weight over 1,000 mAh/g as shown in FIG. 3. It should be noted that FIG. 3 is a graph showing the charging and discharging characteristic of the battery produced through the method of the present invention. In FIG. 3, the broken line represents the characteristics of the lithium ion secondary battery, in which the positive active substance of the present invention and the conventional conductive material are used, similar to FIG. 2. Further, the solid line represents the characteristics of the lithium ion secondary battery, in which the positive active substance and the positive conductive material of the present invention are used. It should be noted that, similar to FIG. 2, the battery is repeatedly charged and discharged with an electrical current of 50 mA per 1 g of the positive active substance at a discharge termination voltage of 1.0 V and a charge termination voltage of 3.0 V.

As described above, according to the present invention, it is possible to produce the positive conductive material capable of increasing the capacity of the battery at the initial stage.

Further, according to the present invention, a battery production method is provided for producing a battery using a rubber material such as a tire containing sulfur as a raw material. In the method, the raw material is thermally decomposed, so that the raw material is separated into a solid portion and a dry distilled gas. In the next step, the solid portion is separated into a metal and a carbonized portion. In the next step, the carbonized portion is thermally processed to produce the negative active substance or the negative electrode active material.

In the next step, after the negative active substance is produced through the processes described above, the negative active substance is crushed. Then, the negative active substance is mixed with a binder. Then, the mixture is molded to produce the battery (the negative current collector). It should be noted that the binder is similar to that used in the lithium ion secondary battery, in which conventional carbon is used as an active substance. Further, it should be noted that the binder is mixed at a ratio similar to that of the lithium ion secondary battery.

Figure 4:
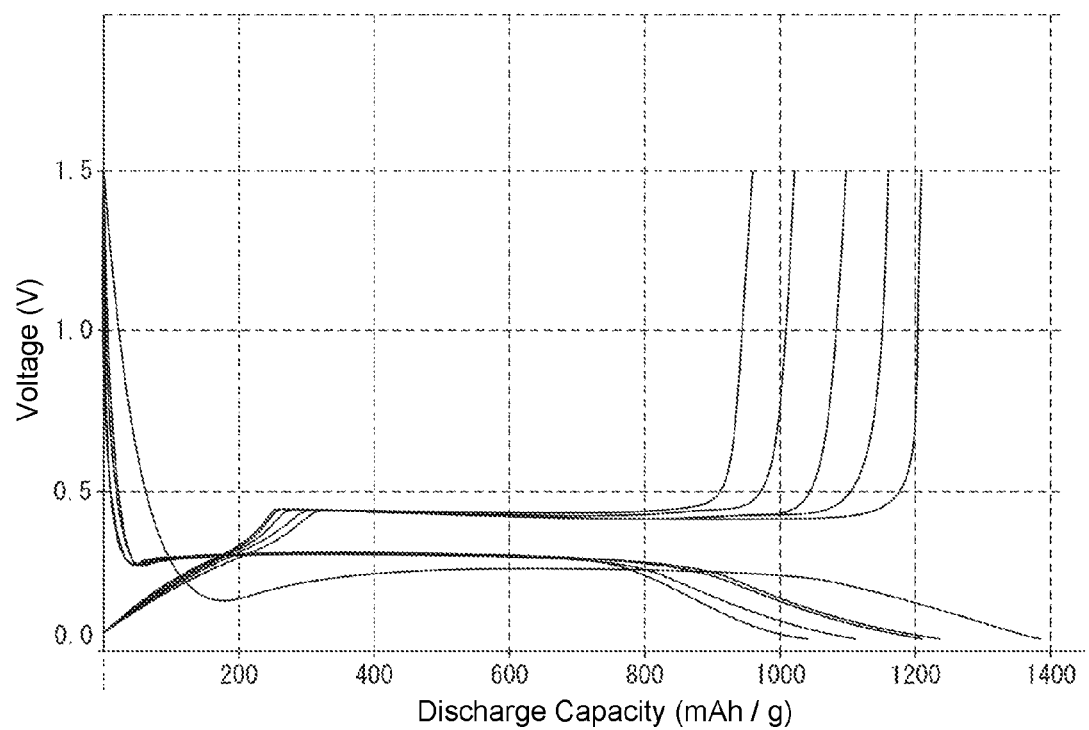
FIG. 4 is a graph showing a charging and discharging characteristic of a battery.

As a result, the lithium ion secondary battery, in which the conventional carbon is used, shows the capacity per weight of 360 mAh/g. On the other hand, the battery, in which the negative active substance of the present invention is used, shows the capacity per weight over 900 mAh/g as shown in FIG. 4. It should be noted that FIG. 4 is a graph showing the charging and discharging characteristic of the battery produced through the method of the present invention. It should be noted that the battery is repeatedly charged and discharged with an electrical current of 50 mA per 1 g of the positive active substance at a discharge termination voltage of 1.0 V and a charge termination voltage of 3.0 V. The battery shows the capacity per weight over 1,200 mAh/g at the initial discharge, and shows the capacity per weight over 400 mAh/g after the battery is repeatedly charged and discharged eleven times.

As described above, according to the present invention, it is possible to produce the negative active substance capable of increasing the capacity of the battery.

As described above, according to the present invention, the battery production method is provided for producing the battery using the rubber material such as a tire containing sulfur as the raw material. In the method, the raw material is thermally decomposed, so that the raw material is separated into the solid portion and the dry distilled gas. In the next step, the dry distilled gas is cooled, so that the dry distilled gas is separated into the oil portion and the gaseous portion. In the next step, the oil portion is distilled, so that the oil portion is separated into the heavy oil, the light oil, and sulfur. In the next step, the heavy oil and sulfur are kneaded and thermally processed to produce the positive active substance or the positive electrode active material of the battery.

Further, according to the present invention, the solid portion is separated into the metal and the carbonized portion. In the next step, the carbonized portion is thermally processed to produce the positive conductive material or the negative active substance of the battery. In the next step, the positive active substance and the positive conductive material are used to produce the positive current collector of the battery. Further, the negative active substance is used to produce the negative current collector of the battery. Further, the positive current collector and the negative current collector are used to produce the battery.

It should be noted that the positive active substance, the positive conductive material, the positive current collector, and the negative active substance are not limited to produce the same battery. Alternatively, each of the positive active substance, the positive conductive material, the positive current collector, and the negative active substance may be used to produce a separate battery.

As described above, according to the present invention, it is possible to efficiently recycle the rubber material such as the tire and the like that contains sulfur and is discarded by a large quantity into the battery.

What is claimed is:

1. A battery production method for producing a battery, comprising the steps of:
   thermally decomposing a rubber material including a tire containing sulfur as a raw material so that the raw material is separated into a solid portion and a dry distilled gas;
   cooling the dry distilled gas so that the dry distilled gas is separated into an oil portion and a gaseous portion;
   distilling the oil portion so that the oil portion is separated into a heavy oil, a light oil, and sulfur; and
   kneading and thermally processing the heavy oil and the sulfur to produce a positive active substance of the battery.

2. A battery production method for producing a battery, comprising the steps of:
   thermally decomposing a rubber material including a tire containing sulfur as a raw material so that the raw material is separated into a solid portion and a dry distilled gas;
   cooling the dry distilled gas so that the dry distilled gas is separated into an oil portion and a gaseous portion;
   distilling the oil portion so that the oil portion is separated into a heavy oil, a light oil, and sulfur;
   kneading and thermally processing the heavy oil and the sulfur to produce a positive active substance of the battery;
   separating the solid portion into a metal and a carbonized portion;
   thermally processing the carbonized portion to produce a positive conductive material of the battery; and
   producing a positive current collector of the battery using the positive active substance and the positive conductive material.

* * * * *